（12） United States Patent
Akkarakaran et al.

(10) Patent No.: US 10,004,106 B2
(45) Date of Patent: Jun. 19, 2018

(54) CONTINUOUS PACKET CONNECTIVITY (CPC) WITH DEDICATED CHANNEL (DCH) ENHANCEMENTS

(71) Applicant: QUALCOMM Incorporated, San Diego, CA (US)

(72) Inventors: Sony Akkarakaran, Poway, CA (US); Peyman Razaghi, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 14/569,362

(22) Filed: Dec. 12, 2014

(65) Prior Publication Data

US 2015/0271869 A1    Sep. 24, 2015

Related U.S. Application Data

(60) Provisional application No. 61/969,026, filed on Mar. 21, 2014.

(51) Int. Cl.
*H04W 76/28* (2018.01)
*H04W 76/20* (2018.01)
(Continued)

(52) U.S. Cl.
CPC ....... *H04W 76/28* (2018.02); *H04W 52/0216* (2013.01); *H04W 72/04* (2013.01); *H04W 72/042* (2013.01); *H04W 72/0413* (2013.01); *H04W 76/04* (2013.01); *H04W 76/048* (2013.01); *H04W 76/20* (2018.02); *H04W 52/44* (2013.01); *Y02D 70/00* (2018.01);
(Continued)

(58) Field of Classification Search
CPC ........... H04W 76/048; H04W 52/0216; H04W 52/44; H04W 72/042; H04W 72/0413; H04L 1/1812; H04L 1/0026
See application file for complete search history.

(56) References Cited

U.S. PATENT DOCUMENTS

2008/0102880 A1* 5/2008 Gholmieh ........... H04W 52/228
455/522
2010/0157953 A1* 6/2010 Christoffersson . H04W 72/1294
370/336

(Continued)

OTHER PUBLICATIONS

Aho K., "HSPA Systems", Magister Solutions, Jan. 1, 2008 (Jan. 1, 2008),—Jan. 1, 2008 (Jan. 1, 2008), 70 Pages, XP002741339, Finland p. 54-p. 59.

(Continued)

*Primary Examiner* — Peter Chen
(74) *Attorney, Agent, or Firm* — Arent Fox LLP

(57) ABSTRACT

The present disclosure presents aspects for performing continuous packet connectivity (CPC) with dedicated channel (DCH) enhancements at a user equipment (UE). For example, the aspects may include identifying whether DTX is allowed in association with the CPC at the UE during a time period, determining whether DTX is allowed in association with the DCH enhancements at the UE during the time period, and performing DTX at the UE during the time period when both the CPC and the DCH enhancements allow for DTX. As such, CPC with DCH enhancements at a UE may be performed.

26 Claims, 10 Drawing Sheets

(51) Int. Cl.
*H04W 72/04* (2009.01)
*H04W 52/44* (2009.01)
*H04W 52/02* (2009.01)
*H04W 76/04* (2009.01)

(52) U.S. Cl.
CPC ...... *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/24* (2018.01); *Y02D 70/25* (2018.01)

(56) References Cited

U.S. PATENT DOCUMENTS

| | | | | |
|---|---|---|---|---|
| 2011/0170420 | A1* | 7/2011 | Xi | H04L 5/001 370/241 |
| 2012/0113825 | A1* | 5/2012 | Baglin | H04W 24/00 370/252 |
| 2013/0021992 | A1* | 1/2013 | Marco | H04W 56/00 370/329 |
| 2014/0301368 | A1* | 10/2014 | Chen | H04W 36/0083 370/331 |

OTHER PUBLICATIONS

Huawei, et al., "Scenarios for DCH enhancement", 3GPP Draft; R1-130513 Scenario for DCH Enhancement, 3rd Generation Partnership Project (3GPP), Mobile Competence Centre; 650, Route Des Lucioles; F-06921 Sophia-Antipolis Cedex; France, vol. RAN WG1, No. St Julian; 20130128-20130201, Jan. 19, 2013 (Jan. 19, 2013), 2 Pages, XP050663779, Retrieved from the Internet: URL: http://www.3gpp.org/ftp/tsg_ran/WG1_RL1/TSGR1_72/Docs/ [retrieved on Jan. 19, 2013] paragraph [0004] the whole document.
International Search Report and Written Opinion—PCT/US2015/020472—ISA/EPO—Jul. 3, 2015. (11 total pages).
Qualcomm Incorporated: "DCH Enhancements for UMTS", 3GPP Work Item, Dec. 21, 2012 (Dec. 21, 2012), 8 Pages, XP002741338, Barcelona.
Qualcomm Incorporated: "TP on Link Analysis of VoHSPA", 3GPP Draft; R1-133689_TP on Link Analysis of VOHSPA, 3rd Generation Partnership Project (3GPP), Mobile Competence Centre; 650, Route Des Lucioles; F-06921 Sophia-Antipolis Cedex; France, vol. RAN WG1, No. Barcelona, Spain; Aug. 19, 2013-Aug. 23, 2013, Aug. 10, 2013 (Aug. 10, 2013), 18 Pages, XP050716774, Retrieved from the Internet: URL: http://www.3gpp.org/ftp/tsg_ran/WG1_RL1/TSGR1_74/Docs/ [retrieved on Aug. 10, 2013] p. 10.4.1.
Qualcomm Incorporated: "TP on System Performance of VoHSPA", 3GPP Draft; R1-133691_TP on System Performance of VOHSPA, 3rd Generation Partnership Project (3GPP), Mobile Competence Centre; 650, Route Des Lucioles; F-06921 Sophia-Antipolis Cedex; France, vol. Ran WG1, No. Barcelona, Spain; Aug. 19, 2013-Aug. 23, 2013, Aug. 10, 2013 (Aug. 10, 2013), 12 Pages, XP050716775, Retrieved from the Internet: URL: http://www.3gpp.org/ftp/tsg_ran/WG1_RL1/TSGR1_74/Docs/ [retrieved on Aug. 10, 2013] the whole document.

* cited by examiner

CONTINUOUS PACKET CONNECTIVITY (CPC) WITH DEDICATED CHANNEL (DCH) ENHANCEMENTS

CLAIM OF PRIORITY

The present application for patent claims priority to U.S. Provisional Patent Application No. 61/969,026, filed Mar. 21, 2014, entitled "CPC with DCH Enhancements," which is assigned to the assignee hereof, and hereby expressly incorporated by reference herein.

BACKGROUND

Aspects of the present disclosure relate generally to wireless communication systems, and more particularly, to continuous packet connectivity (CPC) with dedicated channel (DCH) enhancements at a user equipment (UE).

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

The continuous packet connectivity (CPC) feature provides for battery power savings at a user equipment (UE) by using discontinuous transmission (DTX) on a uplink (UL) and/or a discontinuous reception (DRX) on a downlink (DL). However, CPC is not allowed if dedicated channel (DCH) enhancements feature is configured at the UE as DCH is circuit-switched in nature and CPC is packet-switched in nature.

Therefore, there is a desire for improvements in continuous packet connectivity (CPC) operation at a user equipment (UE).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents an example method and apparatus for discontinuous transmission (DTX) when continuous packet connectivity (CPC) and dedicated channel (DCH) enhancements are configured at a user equipment (UE). For example, the present disclosure presents an example method for identifying whether DTX is allowed in association with the CPC at the UE during a time period, determining whether DTX is allowed in association with the DCH enhancements at the UE during the time period, and performing DTX at the UE during the time period when both the CPC and the DCH enhancements allow for DTX.

Additionally, the present disclosure presents an example apparatus for discontinuous transmission (DTX) when continuous packet connectivity (CPC) and dedicated channel (DCH) enhancements are configured at a user equipment (UE) that may include means for identifying whether DTX is allowed in association with the CPC at the UE during a time period, means for determining whether DTX is allowed in association with the DCH enhancements at the UE during the time period, and means for performing DTX at the UE during the time period when both the CPC and the DCH enhancements allow for DTX.

In a further aspect, the presents disclosure presents an example non-transitory computer readable medium storing computer executable code for performing discontinuous transmission (DTX) when continuous packet connectivity (CPC) and dedicated channel (DCH) enhancements are configured at a user equipment (UE) that may include code for identifying whether DTX is allowed in association with the CPC at the UE during a time period, code for determining whether DTX is allowed in association with the DCH enhancements at the UE during the time period, and code for performing DTX at the UE during the time period when both the CPC and the DCH enhancements allow for DTX.

Furthermore, in an aspect, the present disclosure presents an example apparatus for performing discontinuous transmission (DTX) when continuous packet connectivity (CPC) and dedicated channel (DCH) enhancements are configured at a user equipment (UE) that may include a CPC configuration component to identify whether DTX is allowed in association with the CPC at the UE during a time period, a DCH enhancements configuration component to determine whether DTX is allowed in association with the DCH enhancements at the UE during the time period, and a DTX component to perform DTX at the UE during the time period when both the CPC and the DCH enhancements allow for DTX.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present disclosure presents an example method and apparatus for discontinuous transmission (DTX) when continuous packet connectivity (CPC) and dedicated channel (DCH) enhancements are configured at a user equipment (UE). For example, the example method may include identifying whether DTX is allowed in association with the CPC at the UE during a time period, determining whether DTX is allowed in association with the DCH enhancements at the UE during the time period, and performing DTX at the UE during the time period when both the CPC and the DCH enhancements allow for DTX.

Figure 1:
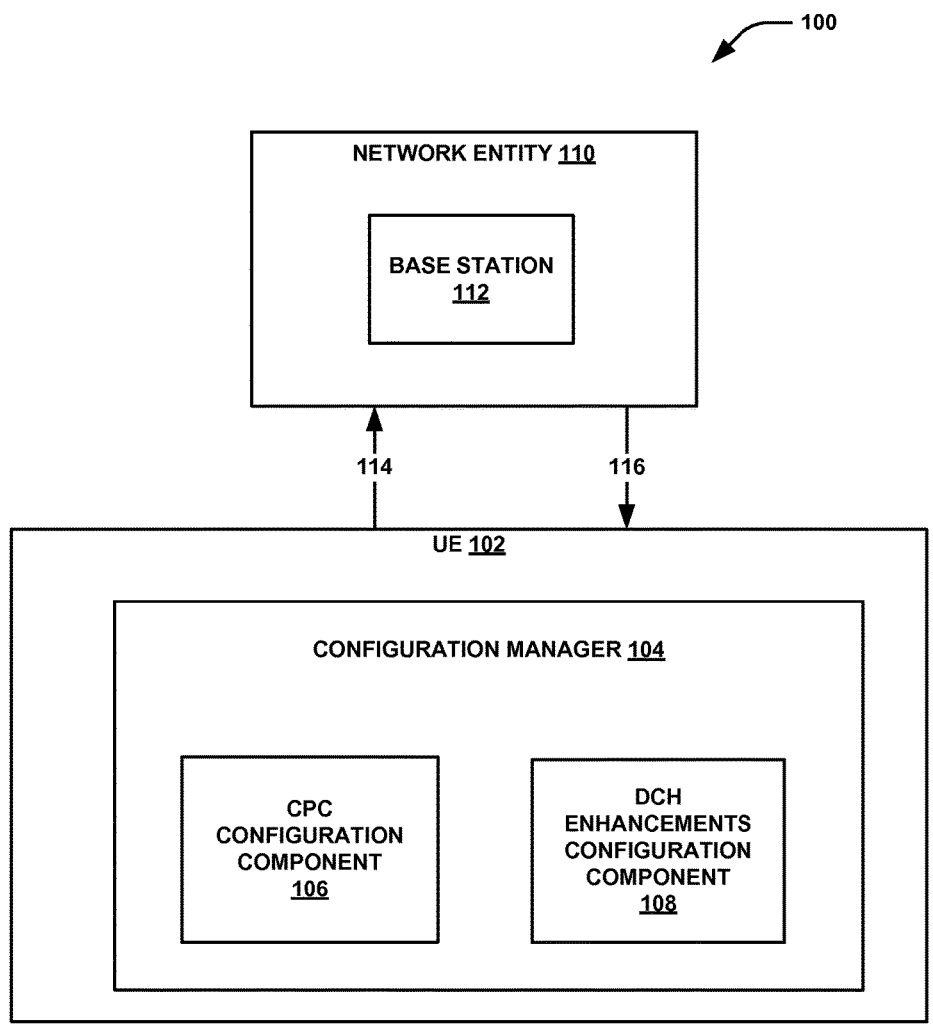
FIG. 1 is a block diagram illustrating an example wireless system in aspects of the present disclosure.

Referring to FIG. 1, a wireless communication system 100 is illustrated that facilitates configuring continuous packet connectivity (CPC) with dedicated channel (DCH) enhancements at a user equipment (UE). For example, system 100 includes a UE 102 that may communicate with a network entity 110 and/or a base station 112 via one or more over-the-air links 114 and/or 116. For example, UE 102 may communicate with base station 112 on an uplink (UL) 114 and/or a downlink (DL) 116. The UL 114 is generally used for communication from UE 102 to base station 112 and/or the DL 116 is generally used for communication from base station 112 to UE 102.

In an aspect, network entity 110 may include one or more of any type of network components, for example, an access point, including a base station (BS) or Node B or eNode B or a femto cell, a relay, a peer-to-peer device, an authentication, authorization and accounting (AAA) server, a mobile switching center (MSC), a radio network controller (RNC), etc., that can enable UE 102 to communicate and/or establish and maintain wireless communication links 114 and/or 116, which may include a communication session over a frequency or a band of frequencies that form a communication channel, to communicate with network entity 110 and/or base station 112. In an additional aspect, for example, base station 112 may operate according to a radio access technology (RAT) standard, e.g., GSM, CDMA, W-CDMA, HSPA or a long term evolution (LTE).

In an additional aspect, UE 102 may be a mobile apparatus and may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

In an aspect, UE 102 may be configured to include a configuration manager 104 to perform discontinuous transmission (DTX) when continuous packet connectivity (CPC) and dedicated channel (DCH) enhancements are configured at UE 102. For example, configuration manager 104 may include a CPC configuration component 106 to identify whether DTX is allowed in association with the CPC at the UE during a time period. Also, UE 102 may be configured to include a DCH enhancements configuration component 108 to determine whether DTX is allowed in association with the DCH enhancements at the UE during the time period.

As such, in an additional aspect, when both the CPC and the DCH enhancements allow for DTX during the time period, configuration manager 104 may configure UE 102 to perform a discontinuous transmission at the UE (e.g., of one or more uplink channels) during the time period.

In an additional or optional aspect, configuration manager 104 may configure UE 102 to receive a transmit power control (TPC) bit on a downlink dedicated physical control channel (DL DPCCH) in the time period, wherein the time period is a same time period for receiving a fractional-dedicated physical channel (F-DPCH).

In an additional or optional aspect, UE 102 may be configured to include a configuration manager 104 to perform discontinuous reception (DRX) at the UE during the time period when both the CPC and the DCH enhancements allow for DRX. For example, configuration manager 104 may include the CPC configuration component 106 to identify whether discontinuous reception (DRX) is allowed in association with the CPC at the UE during the time period. Also, UE 102 may be configured to include DCH enhancements configuration component 108 to determine whether DRX is allowed in association with the DCH enhancements at the UE during the time period. As such, when both the CPC and the DCH enhancements allow for DRX during the time period, configuration manager 104 may configure UE 102 to perform a discontinuous reception at the UE (e.g., of one or more uplink channels) during the time period.

Additional aspects, which may be performed in combination with the above aspects or independently thereto, are discussed below and may lead to configuring CPC with DCH enhancements at UE 102.

Figure 2:
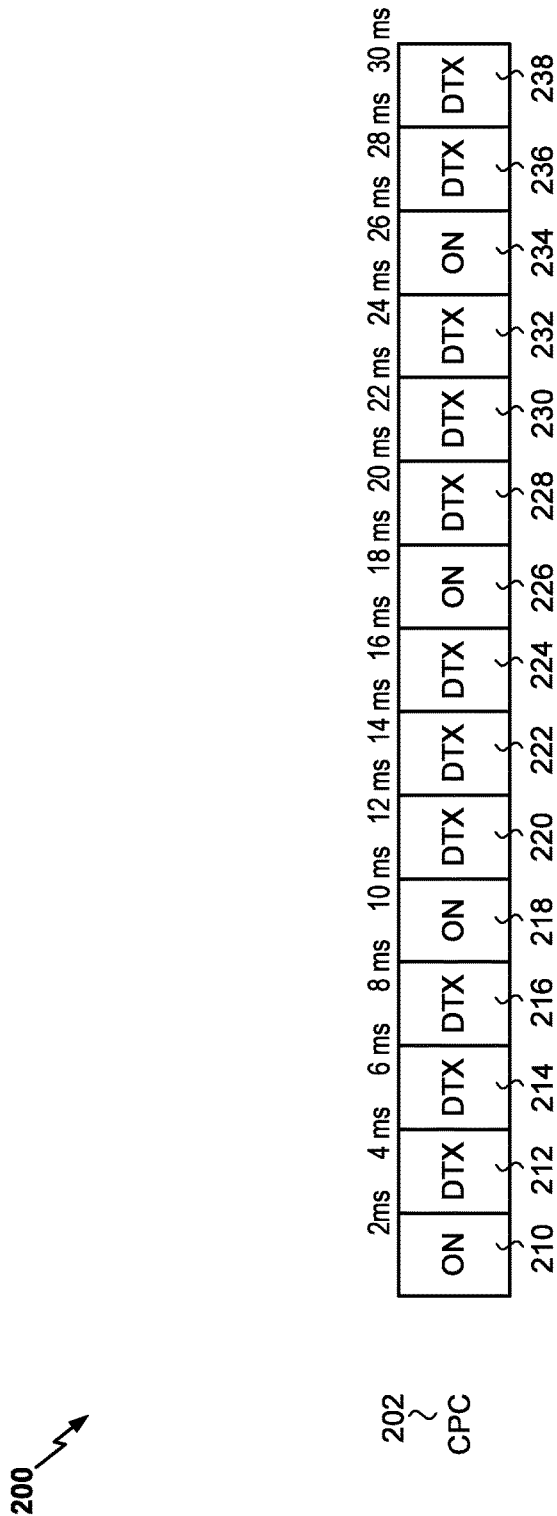
FIG. 2 is a block diagram of uplink frames over time, illustrating an example aspect of continuous packet connectivity.

FIG. 2 illustrates an example aspect of a frame structure 200 of radio frames for CPC 202 with 2 ms TTI, which may be used by UE.

The CPC or CPC feature generally includes discontinuous transmission (DTX) of one or more channels on uplink 114 and/or discontinuous reception (DRX) of one or more channels on downlink 116 at the UE to reduce cell interference, increase system capacity, and/or to reduce battery consumption.

Discontinuous transmission associated with CPC allows UE 102 to transmit discontinuously on the uplink during periods of inactivity in data transmission. For instance, in an aspect, UE 102 may transmit discontinuously on an uplink channel, e.g., uplink dedicated physical control channel (UL DPCCH), high speed dedicated physical control channel (HS DPCCH), etc. during periods of inactivity in data transmission. For instance, with DTX, UE 102 may transmit the UL DPCCH or HS DPCCH in certain patterns or cycles during the periods of inactivity.

Additionally, for example, discontinuous reception (DRX) associated with CPC allows UE 102 to receive discontinuously on the downlink during periods of inactivity in data reception. For instance, in an aspect, UE 102 may receive a downlink channel (e.g., DL DPCCH) discontinuously on the DL instead of listening continuously and thus save battery power at the UE. DRX at the UE may be particularly helpful if the nature of data that is downloaded is periodic or in short bursts, and there is no need for the UE to receive the control channel in the downlink during periods of inactivity.

In an aspect, UE 102 may notify network entity 110 and/or base station 112 (e.g., at setup time) whether the UE 102 supports CPC. The UE 102 may identify whether it supports CPC based on a UE Release number (e.g., Rel. 10, 11, 12, etc.) and one or more UE capabilities (e.g., UMTS, HDDPA, LTE, etc.). Once network entity 110 and/or base station 112 receives the notification from the UE 102, the network entity 110 and/or base station 112 decides whether to configure the UE 102 with CPC (e.g., trigger a CPC mode) based on, e.g., network configuration, and sends CPC configuration information (e.g., TTI duration, number of TTIs the UE will be transmitting/receiving, number of TTIs UE enters DTX/DRX state, etc.), and the UE 102 is configured accordingly.

For instance, in an aspect, UE 102 may be configured to allow CPC. As described in reference to FIG. 2, CPC 202 may be configured with 2 ms TTI with the UE 102 transmitting under normal or typical power conditions (e.g., indicated by "ON" in FIG. 2) during first TTI 210 and performing a discontinuous transmission (e.g., no transmission) during the next three TTIs (e.g., TTIs 212, 214, and 216). That is, UE 102 transmits normal power conditions from 0 ms-2 ms and performs a discontinuous transmission from 2 ms-8 ms. This behavior, transmitting for 2 ms and performing discontinuous transmission for 6 ms may repeat based on CPC configuration information received from network entity 110 and/or base station 112. Further, the UE 102 may be transmitting normally (e.g., not discontinuously) from 8 ms-10 ms (e.g., TTI 218), performing discontinuous transmission (e.g., no transmission) from 10 ms-16 ms (e.g., TTIs 220, 222, and 224), transmitting normally from 16 ms-18 ms (e.g., TTI 226), performing discontinuous transmission (e.g., no transmission) from 18 ms-24 ms (e.g., TTIs 228, 230, and 232), transmitting normally from 24 ms-26 ms (e.g., TTI 234), performing discontinuous transmission (e.g., no transmission) from 26 ms-30 ms (e.g., TTIs 236 and 238), and so on, as shown in FIG. 2.

Although an example of radio frames for CPC 202 are illustrated (FIG. 2) and described (above) in reference to DTX for channels on the uplink, CPC 202 may apply in a similar manner to DRX for channels on the downlink at the UE 102. In an additional aspect, CPC 202 may be implemented using other patterns of DTX and/or DRX, and DTX/DRX rules associated with CPC are based on 3GPP Releases prior to Release 12.

Figure 3:
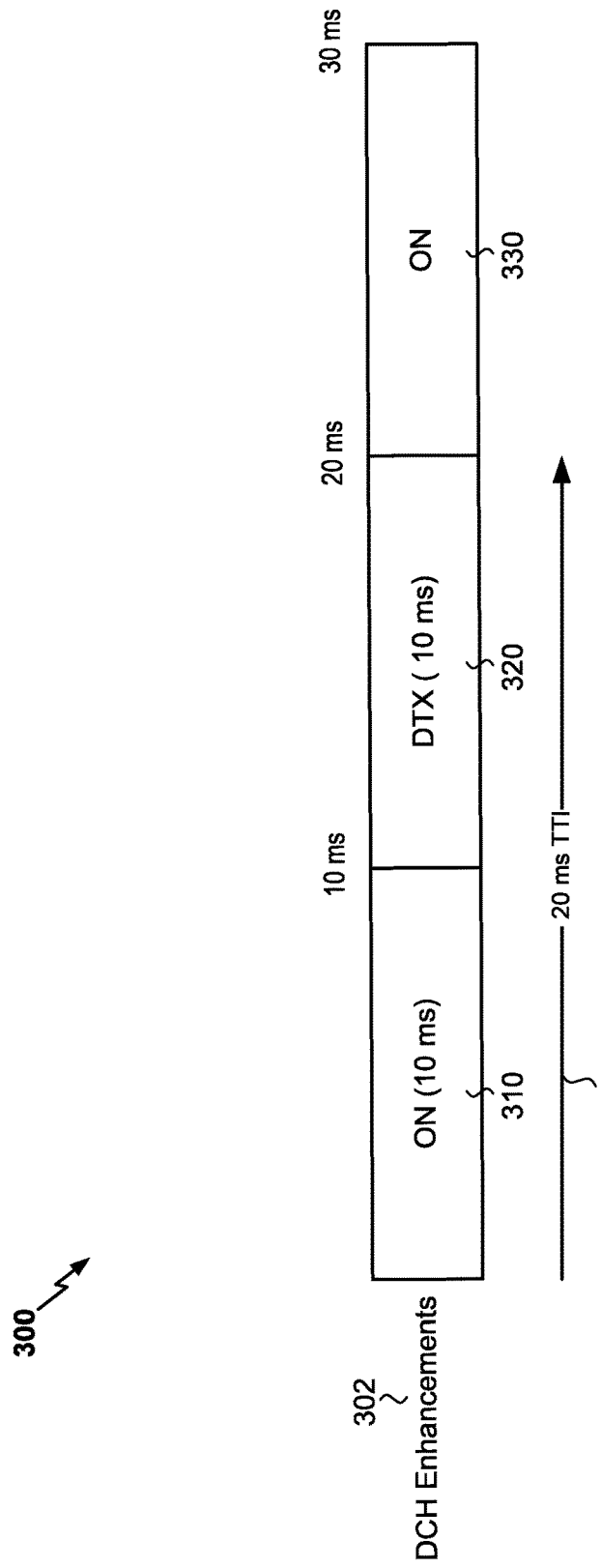
FIG. 3 is a block diagram of uplink frames over time, illustrating an example aspect of DCH enhancements.

FIG. 3 illustrates an example aspect of a frame structure 300 of radio frames for DCH enhancements 302 with 10 ms TTI operation, which may be used by UE 102.

For example, in an aspect, UE 102 may notify network entity 110 and/or base station 112 (e.g., at setup time) whether the UE 102 supports DCH enhancements 302. The UE 102 may identify whether it supports DCH enhancements based on a UEs Release number (e.g., Rel. 10, 11, 12, etc.) and/or based on the capabilities of the UE. If the UE 102 supports DCH enhancements, the UE 102 may notify network entity 110 and/or base station 112 whether the UE 102 supports DCH enhancements in "basic mode" or "full mode." For example, in the full mode, UE 102 may utilize a downlink (DL) frame early termination (FET) feature, which is a sub-feature of DCH enhancements that is supported only in the full mode. Also, in both basic and full mode, UE 102 may utilize dynamic 10 ms/20 ms switching on the UL, which is another sub-feature of DCH enhancements that is supported in both modes. For example, with dynamic 10 ms/20 ms switching, the UE 102 decides for each voice packet whether to use 10 ms or 20 ms transmission on the UL based on, for example, power headroom (e.g., available transmit power) at the UE using procedures as defined in 3GPP Specifications.

The DL FET feature may be generally defined as periodically decoding partially received voice frames (e.g., at base station 112) and sending an acknowledgement (e.g., to UE 102) upon successful decoding of a voice frame at base station 112. This allows the UE 102 to terminate the transmission to base station 112 early, leading to reduced use of radio resources, reduced interference, and reduced power consumption. The 10 ms TTI operation of UE 102 on the UL may be generally defined as UE 102 transmitting a 20 ms voice frame in 10 ms by compressing the frame (e.g., compressed mode of operation). For example, the compressed mode of operation may be achieved by decreasing the spreading factor by 2:1 (e.g., increases the data rate so bits will get sent twice as fast), puncturing bits (e.g., removes bits from the original data and reduces the amount of information that needs to be transmitted), or changing higher layer scheduling to use less timeslots for user traffic.

Once network entity 110 and/or base station 112 receives notification from the UE 102 regarding support for DCH enhancements 302, the network entity 110 and/or base station 112 decides whether to configure the UE 102 with DCH enhancements based on, e.g., network configuration, and sends DCH enhancements configuration information to UE 102.

For instance, in an aspect, UE 102 may be configured to allow DCH enhancements 302. As described in reference to FIG. 3, although DCH enhancements 302 may be configured with 20 ms TTI 340, UE 102 may be transmitting under normal conditions (e.g., indicated by "ON" in FIG. 3) during the first 10 ms 310 of TTI 340 and performing a discontinuous transmission (e.g., no transmission) during the second 10 ms 320 of TTI 340. That is, UE 102 transmits normally from 0 ms-10 ms and performs a discontinuous transmission from 10 ms-20 ms. This behavior, transmitting normally for 10 ms and performing discontinuous transmission (e.g., no transmission) for 10 ms may repeat based on DCH enhancements configuration information received from network entity 110 and/or base station 112. Further, the UE 102 may be transmitting normally (e.g., not discontinuously) from 20 ms-30 ms, e.g., at 330, and so on as shown in FIG. 3.

Although an example of radio frames for DCH enhancements 302 is illustrated (FIG. 3) and described (above) in reference to DTX for channels on the uplink, DCH enhancements 302 may apply in a similar manner to DRX for channels on the downlink at the UE 102. In an additional aspect, DCH enhancements 302 may be implemented using other patterns of DTX and/or DRX, and DTX/DRX rules associated with DCH enhancements 302 based on 3GPP Releases prior to Release 12.

Figure 4:
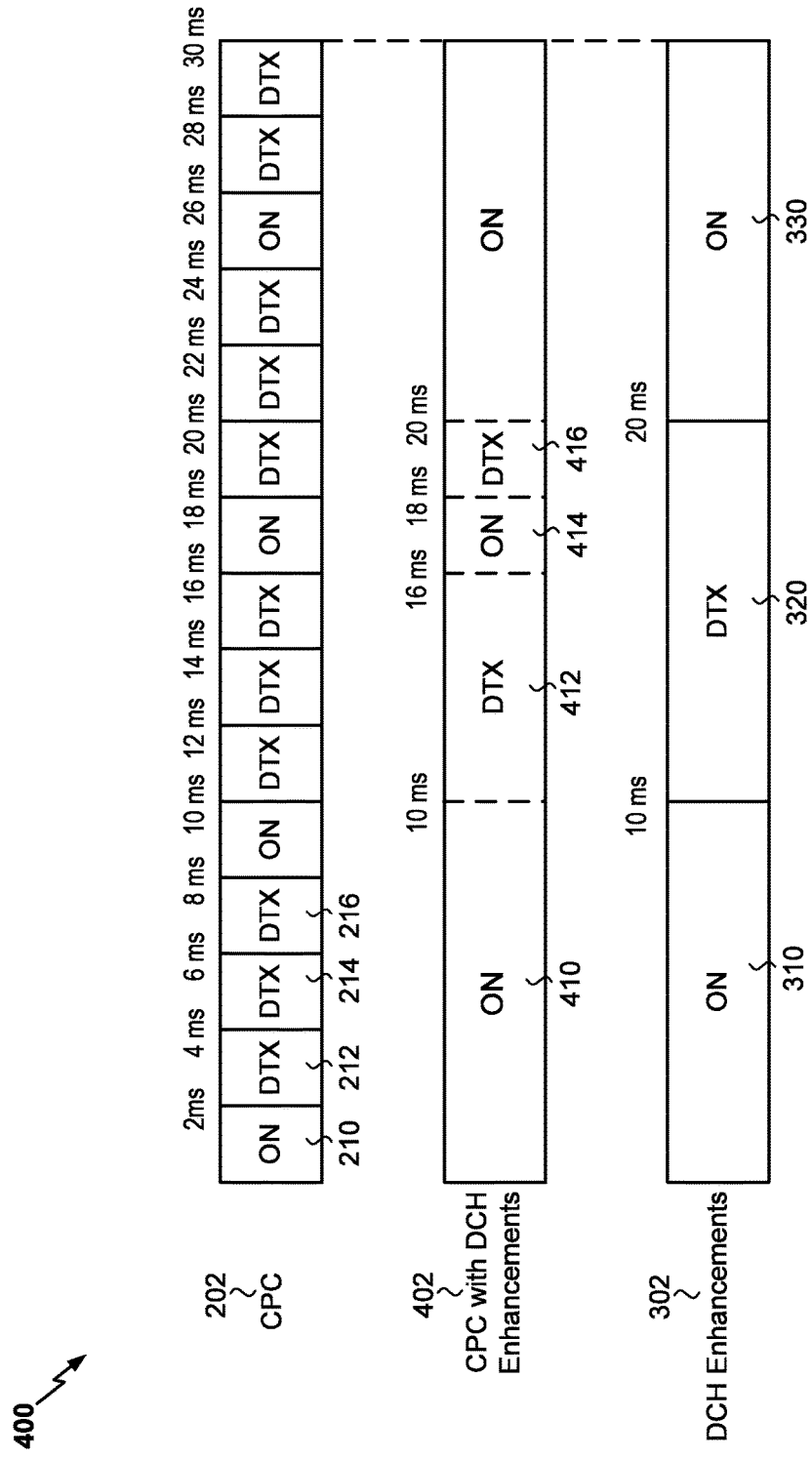
FIG. 4 is a block diagram of uplink frames over time, illustrating an example aspect of the present disclosure.

FIG. 4 is a block diagram of uplink frames 400 over time, illustrating an example for performing DTX (or DRX) when both CPC and DCH enhancements 402 are configured, in an aspect of the present disclosure.

In an aspect, referring to radio frames for CPC and DCH enhancements 402, UE 102 and/or configuration manager 104 may perform discontinuous transmission at the UE (e.g., of one or more uplink channels, and/or discontinuous reception of one or more downlink channels) at the UE 102 during the time period both CPC and DCH enhancements are allowed. It should be noted that the separate radio frames for CPC 202 and DCH enhancements 302 are shown for reference purposes only.

For instance, in an aspect of uplink frames for CPC and DCH enhancements 402, UE 102 may transmit normally (e.g., transmit "ON") during 0 ms-10 ms, at 410, perform discontinuous transmission (e.g., no transmission) from 10 ms-16 ms, at 412, transmit normally (e.g., transmit "ON") from 16 ms-18 ms, at 414, and perform discontinuous transmission of all uplink channels from 18 ms-20 ms, 416, and so on. That is, UE 102 and/or configuration manager 104 performs discontinuous transmission at the UE during time periods 412 and 416 where the time periods for CPC and DCH enhancements overlap or align, as shown in FIG. 4.

Although an example of radio frames for CPC and DCH enhancements 402 are illustrated (FIG. 4) and described (above) in reference to DTX for channels on the uplink, CPC and DCH enhancements 402 may apply in a similar manner to DRX for channels on the downlink at UE 102. In an additional aspect, CPC and DCH enhancements 402 may be implemented using other patterns of DTX and/or DRX.

In an additional aspect, as described in reference to FIG. 4, UE 102 and/or configuration manager 104 may suspend or temporarily stop transmission of the uplink at UE 102 when all the uplink channels are performing a discontinuous transmission (DTX) (e.g., at 412 and 416) and/or suspend or temporarily stop reception of the downlink at the UE 102 when all the downlink channels are performing a discontinuous reception (DRX).

Figure 5:
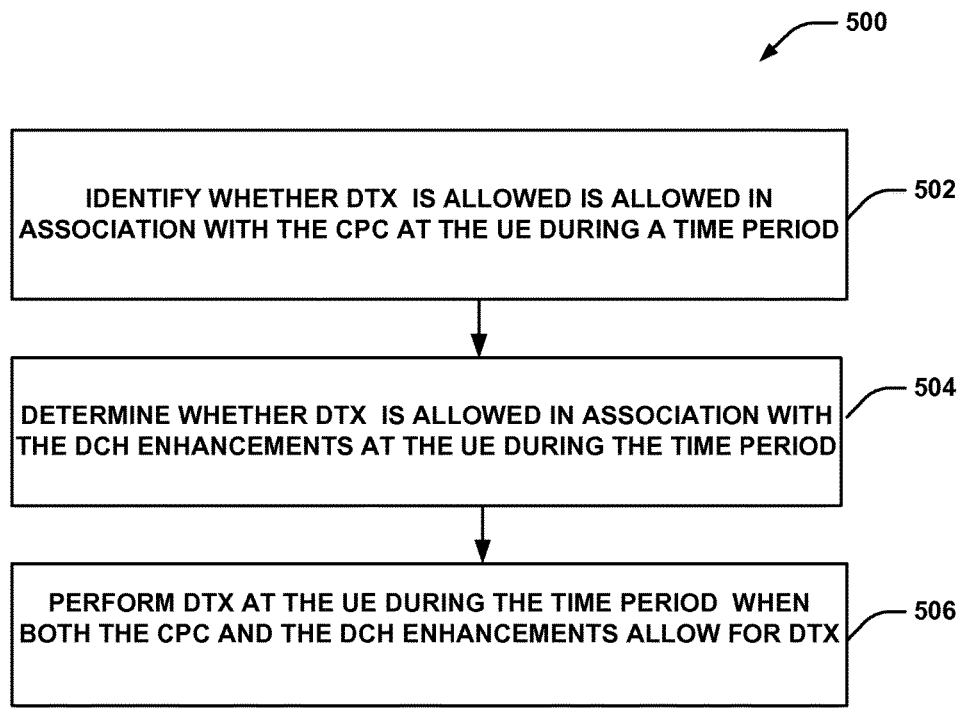
FIG. 5 is a flow diagram illustrating aspects of an example method in aspects of the present disclosure.

FIG. 5 illustrates an example methodology 500 for performing discontinuous transmission (DTX) when continuous packet connectivity (CPC) and dedicated channel (DCH) enhancements are configured at a user equipment (UE).

In an aspect, at block 502, methodology 500 may include identifying whether DTX is allowed in association with the CPC at the UE during a time period. For example, in an aspect, UE 102 and/or configuration manager 104 may include a specially programmed processor module, or a processor executing specially programmed code stored in a memory, to identify whether DTX is allowed in association with the CPC (at 202) at UE 102 during a time period (e.g., from 10 ms-16 ms as shown in FIG. 2).

For instance, in an aspect, as described above in reference to FIG. 2, for example, one or more UL channels, e.g., UL DPCCH, HS DPCCH, etc. may be configured for discontinuous transmission during TTIs 220, 222, and 224 (e.g., from 10 ms-16 ms). For instance, in an aspect, configuration manager 104 may configure CPC at UE 102 based on CPC configuration information received, via a communication component (e.g., transceiver) of UE 102, from network entity 110 and/or base station 112. In an aspect, configuration manager 104 may include a CPC configuration component 106 to perform this functionality.

In an aspect, at block 504, methodology 500 may include determining whether DTX is allowed in association with the DCH enhancements at the UE during the time period. For example, in an aspect, UE 102 and/or configuration manager 104 may include a specially programmed processor module, or a processor executing specially programmed code stored in a memory, to determine whether DTX is allowed in association with the DCH enhancements at UE 102 during the time period (e.g., from 10 ms-16 ms as shown in FIG. 3).

For instance, in an aspect as described above in reference to FIG. 3, for example, an uplink channel, e.g., HS DPCCH may be configured for discontinuous transmission during TTI 320 (e.g., from 10 ms-20 ms). For instance, in an aspect, configuration manager 104 may configure DCH enhancements at UE 102 based on DCH enhancements configuration information received, via a communication component (e.g., transceiver) of UE 102, from network entity 110 and/or base station 112. In an aspect, configuration manager 104 may include a DCH enhancements configuration component 108 to perform this functionality.

In an aspect, at block 506, methodology 500 may include performing DTX at the UE during the time period when both the CPC and the DCH enhancements allow for DTX. For example, in an aspect, UE 102 and/or configuration manager 104 may include a specially programmed processor module, or a processor executing specially programmed code stored in a memory, to perform DTX at UE 102 during the time period (e.g., from 10 ms-16 ms, represented by 412 in FIG. 4) when both the CPC and the DCH enhancements allow for DTX.

For instance, in an aspect as described above in reference to FIG. 4, for example, one or more UL channels, e.g., UL DPCCH, HS DPCCH, etc. may be configured for discontinuous transmission from 10 ms-16 ms, at 412. For instance, in an aspect, configuration manager 104 may perform DTX at the UE during the time period when both the CPC and the DCH enhancements allow for DTX via a communication component (e.g., transceiver) of UE 102. In an aspect, configuration manager 104 may include a discontinuous transmission (DTX) component 512 to perform this functionality.

In an additional or optional aspect, configuration manager 104 may be configured to turn off transmission of all channels on an uplink (or downlink) at UE 102 during the time period the discontinuous transmission (or reception) of CPC and DCH overlap (or align) as shown at 412 and 416 in FIG. 4. In an aspect, CPC configuration component 106, DCH enhancements component 108, and/or DTX component 512 may perform this functionality.

In a further additional or optional aspect, configuration manager 104 may be configured to a transmit power control component (TPC) to receive a transmit power control (TPC) bit on a downlink dedicated physical control channel (DL DPCCH) in the time period, wherein the time period is a same time period for receiving a fractional-dedicated physical channel (F-DPCH). In an aspect, TPC component 514 may perform this functionality.

In an additional or optional aspect, UE 102 and/or configuration manager 104 may identify whether discontinuous reception (DRX) is allowed in association with the CPC at the UE during the time period (e.g., 412), determine whether DRX is allowed in association with the DCH enhancements at the UE during the time period (e.g., 412), and perform DRX at the UE during the time period (e.g., 412) when both the CPC and the DCH enhancements allow for DRX. In an aspect, CPC configuration component 106, DCH enhancements component 108, and/or DRX component 516 may perform this functionality.

In an additional aspect, current CPC rules (e.g., CPC rules prior to 3GPP Release 12), such as determining transitions to longer DTX cycle based on traffic activity, transmitting of preambles and postambles before and after data bursts, etc., remain unchanged and independent of the activity or packets carried on DCH. Further, it may not be required to specify additional preambles and postambles for emerging from and re-entering DTX state due to start or end of activity on DCH as the required preambles/postambles for these may be specified as part of DCH enhancements, independent of whether CPC is configured or not.

In an additional or optional aspect, configuration manager 104 may define new patterns for CPC transmission (ON) and DTX (and similarly for reception (ON) and DRX) to align the CPC DTX and DRX periods with the expected gating periods (e.g., ON/DTX, ON/DRX) of DCH enhancements. For instance, in an aspect, since a gating pattern of DCH enhancements may exhibit a periodic behavior with 20 ms voice frame duration, alignment may be obtained with existing CPC implementation by choosing DTX and DRX cycles of CPC to be multiples or factors of 20 ms. Since cycles of 10 ms, 20 ms, and 40 ms are already supported for CPC, no additional optimization of the DTX and DRX pattern may be required (in addition to the needed alignment described above in reference to FIG. 4 above). Furthermore, as DCH transmission/reception takes priority over CPC DTX/DRX, CPC may be configured even with legacy DCH, wherein the DCH would function as if CPC was not configured.

In an aspect, when CPC and DCH enhancements are configured, transmit power control (TPC) bit is carried on DL DPCCH as both fractional-dedicated physical channel (F-DPCH) and DPCH are not simultaneously allowed. In an additional, aspect, if current rules (e.g., rules prior to Release 12) require F-DPCH transmission by Node B/reception by UE at a particular time (e.g., slot), then CPC with DCH enhancements may require transmission/reception of the TPC bit on the DL DPCCH in the same time slot. In a further additional aspect, DL DPCCH may be transmitted/received in that same time slot, and DL DPDCH may be gated if allowed by the DCH enhancements as DL DPDCH transmission is not mandatory.

Thus, as described above, continuous packet connectivity (CPC) with dedicated channel (DCH) enhancements at a user equipment (UE) may be performed.

Figure 6:
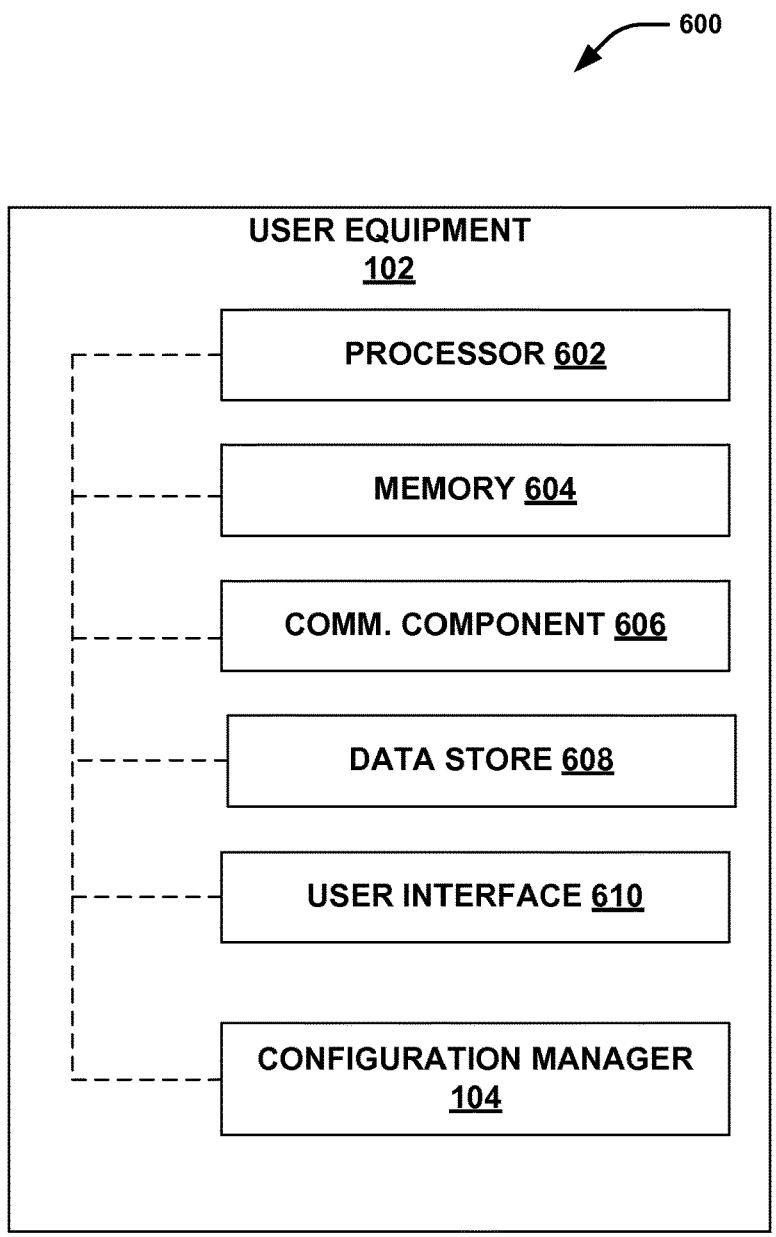
FIG. 6 is a block diagram illustrating aspects of an example user equipment including a configuration manager according to the present disclosure.

Referring to FIG. 6, in an aspect, UE 102, for example, including configuration manager 104, may be or may include a specially programmed or configured computer device to perform the functions described herein. In one aspect of implementation, UE 102 may include configuration manager 104 and its sub-components, including CPC configuration component 106, DCH enhancements configuration component 108, discontinuous transmission (DTX) component 512, a TPC component 514, and/or discontinuous reception (DRX) component 516, such as in specially programmed computer readable instructions or code, firmware, hardware, or some combination thereof.

In an aspect, for example as represented by the dashed lines, configuration manager 104 may be implemented in or executed using one or any combination of processor 602, memory 604, communications component 606, and data store 608. For example, configuration manager 104 may be defined or otherwise programmed as one or more processor modules of processor 602. Further, for example, configuration 104 may be defined as a computer-readable medium (e.g., a non-transitory computer-readable medium) stored in memory 604 and/or data store 608 and executed by processor 602. Moreover, for example, inputs and outputs relating to operations of configuration manager 104 may be provided or supported by communications component 606, which may provide a bus between the components of UE 102 or an interface for communication with external devices or components.

Processor 602 may be specially configured to carry out processing functions associated with one or more of components and functions described herein, including configuration component 104. Processor 602 can include a single or multiple set of processors or multi-core processors. Moreover, processor 602 can be implemented as an integrated processing system and/or a distributed processing system.

Memory 604 may be a storage device, such as for storing data used herein and/or local versions of applications and/or instructions or code being executed by processor 602, such as to perform the respective functions of the respective entities described herein, including configuration component 104. Memory 604 can include any type of memory usable by a computer, such as random access memory (RAM), read only memory (ROM), tapes, magnetic discs, optical discs, volatile memory, non-volatile memory, and any combination thereof.

Communications component 606 may include any device or interface that provides for establishing and maintaining communications with one or more parties utilizing hardware, software, and services as described herein. Communications component 606 may carry communications between components on UE 102, as well as between UE 102 and external devices, such as devices located across a communications network and/or devices serially or locally connected to UE 102. For example, communications component 606 may include one or more buses, and may further include transmit chain components and receive chain components associated with a transmitter and receiver, respectively, or a transceiver, operable for interfacing with external devices.

Additionally, data store 608 can be any suitable combination of hardware and/or software, that provides for mass storage of information, databases, and programs employed in connection with aspects described herein. For example, data store 608 may be a data repository for applications not currently being executed by processor 602.

UE 102 may additionally include a user interface component 610 operable to receive inputs from a user of user equipment 102, and further operable to generate outputs for presentation to the user. User interface component 610 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 610 may include one or more output devices, including but not limited to a display, a speaker, a haptic feedback mechanism, a printer, any other mechanism capable of presenting an output to a user, or any combination thereof.

The various concepts presented throughout this disclosure may be implemented across a broad variety of telecommunication systems, network architectures, and communication standards.

Figure 7:
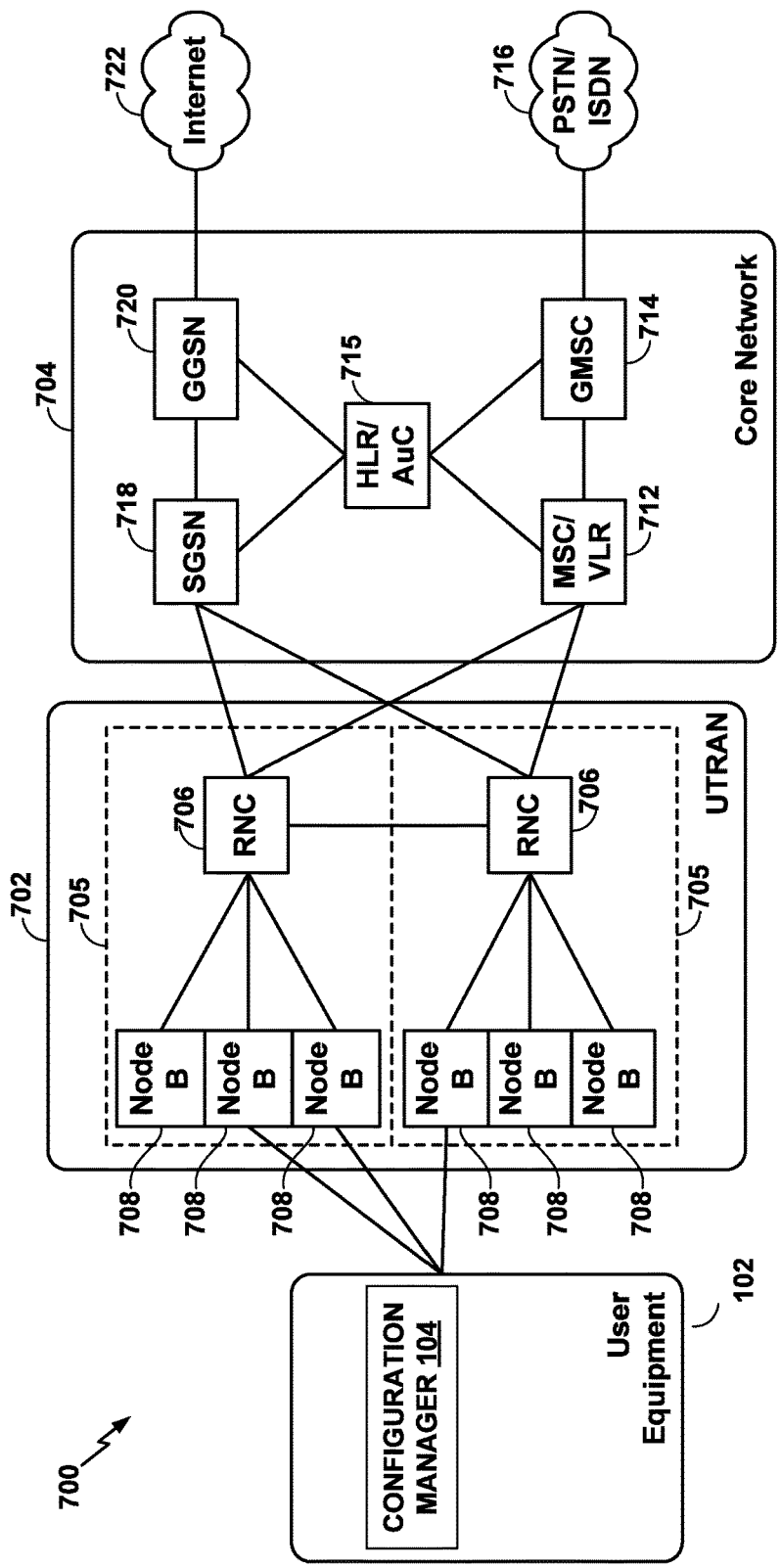
FIG. 7 is a block diagram conceptually illustrating an example of a telecommunications system including a user equipment with a configuration manager according to the present disclosure.

Referring to FIG. 7, by way of example and without limitation, the aspects of the present disclosure are presented with reference to a UMTS system 700 employing a W-CDMA air interface, and may include a UE 102 executing an aspect of configuration manager 104 of FIG. 1. A UMTS network includes three interacting domains: a Core Network (CN) 704, a UMTS Terrestrial Radio Access Network (UTRAN) 702, and UE 102. In an aspect, as noted, UE 102 (FIG. 1) may be configured to perform functions thereof, for example, including performing discontinuous transmission (DTX) when continuous packet connectivity (CPC) and dedicated channel (DCH) enhancements are configured at the UE. Further, UTRAN 702 may comprise network entity 110 and/or base station 112 (FIG. 1), which in this case may be respective ones of the Node Bs 708. In this example, UTRAN 702 provides various wireless services including telephony, video, data, messaging, broadcasts, and/or other services. The UTRAN 702 may include a plurality of Radio Network Subsystems (RNSs) such as a RNS 705, each controlled by a respective Radio Network Controller (RNC) such as an RNC 706. Here, the UTRAN 702 may include any number of RNCs 706 and RNSs 705 in addition to the RNCs 706 and RNSs 705 illustrated herein. The RNC 706 is an apparatus responsible for, among other things, assigning, reconfiguring, and releasing radio resources within the RNS 705. The RNC 706 may be interconnected to other RNCs (not shown) in the UTRAN 702 through various types of interfaces such as a direct physical connection, a virtual network, or the like, using any suitable transport network.

Communication between UE 102 and Node B 708 may be considered as including a physical (PHY) layer and a medium access control (MAC) layer. Further, communication between UE 102 and RNC 706 by way of a respective Node B 708 may be considered as including a radio resource control (RRC) layer. In the instant specification, the PHY layer may be considered layer 1; the MAC layer may be considered layer 2; and the RRC layer may be considered layer 3. Information herein below utilizes terminology introduced in the RRC Protocol Specification, 3GPP TS 77.331 v7.1.0, incorporated herein by reference.

The geographic region covered by the RNS 705 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 708 are shown in each RNS 705; however, the RNSs 705 may include any number of wireless Node Bs. The Node Bs 708 provide wireless access points to a CN 704 for any number of mobile apparatuses, such as UE 102, and may be network entity 110 and/or base station 112 of FIG. 1. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus in this case is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

For illustrative purposes, one UE 102 is shown in communication with a number of the Node Bs 708. The DL, also called the forward link, refers to the communication link from a Node B 708 to a UE 102 (e.g., link 116), and the UL, also called the reverse link, refers to the communication link from a UE 102 to a Node B 708 (e.g., link 114).

The CN 704 interfaces with one or more access networks, such as the UTRAN 702. As shown, the CN 704 is a GSM core network. However, as those skilled in the art will recognize, the various concepts presented throughout this disclosure may be implemented in a RAN, or other suitable access network, to provide UEs with access to types of CNs other than GSM networks.

The CN 704 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 704 supports circuit-switched services with a MSC 712 and a GMSC 714. In some applications, the GMSC 714 may be referred to as a media gateway (MGW). One or more RNCs, such as the RNC 706, may be connected to the MSC 712. The MSC 712 is an apparatus that controls call setup, call routing, and UE mobility functions. The MSC 712 also includes a VLR that contains subscriber-related information for the duration that a UE is in the coverage area of the MSC 712. The GMSC 714 provides a gateway through the MSC 712 for the UE to access a circuit-switched network 716. The GMSC 714 includes a home location register (HLR) 715 containing subscriber data, such as the data reflecting the details of the services to which a particular user has subscribed. The HLR is also associated with an authentication center (AuC) that contains subscriber-specific authentication data. When a call is received for a particular UE, the GMSC 714 queries the HLR 715 to determine the UE's location and forwards the call to the particular MSC serving that location.

The CN 704 also supports packet-data services with a serving GPRS support node (SGSN) 718 and a gateway GPRS support node (GGSN) 720. GPRS, which stands for General Packet Radio Service, is designed to provide packet-data services at speeds higher than those available with standard circuit-switched data services. The GGSN 720 provides a connection for the UTRAN 702 to a packet-based network 722. The packet-based network 722 may be the Internet, a private data network, or some other suitable packet-based network. The primary function of the GGSN 720 is to provide the UEs 104 with packet-based network connectivity. Data packets may be transferred between the GGSN 720 and the UEs 102 through the SGSN 718, which performs primarily the same functions in the packet-based domain as the MSC 712 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 708 and a UE 102. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 102 provides feedback to Node B 708 over the HS-DPCCH to indicate whether it correctly decoded a packet on the downlink.

HS-DPCCH further includes feedback signaling from the UE 102 to assist the Node B 708 in taking the right decision in terms of modulation and coding scheme and precoding weight selection, this feedback signaling including the CQI and PCI.

HSPA Evolved or HSPA+ is an evolution of the HSPA standard that includes MIMO and 64-QAM, enabling increased throughput and higher performance. That is, in an aspect of the disclosure, the Node B 708 and/or the UE 102 may have multiple antennas supporting MIMO technology. The use of MIMO technology enables the Node B 708 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multi-path fading and increase transmission quality, and spatial multiplexing gains to increase data throughput.

Spatial multiplexing may be used to transmit different streams of data simultaneously on the same frequency. The data steams may be transmitted to a single UE 102 to increase the data rate or to multiple UEs 102 to increase the overall system capacity. This is achieved by spatially precoding each data stream and then transmitting each spatially precoded stream through a different transmit antenna on the downlink. The spatially precoded data streams arrive at the UE(s) 102 with different spatial signatures, which enables each of the UE(s) 102 to recover the one or more the data streams destined for that UE 102. On the uplink, each UE 102 may transmit one or more spatially precoded data streams, which enables Node B 7108 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 8:
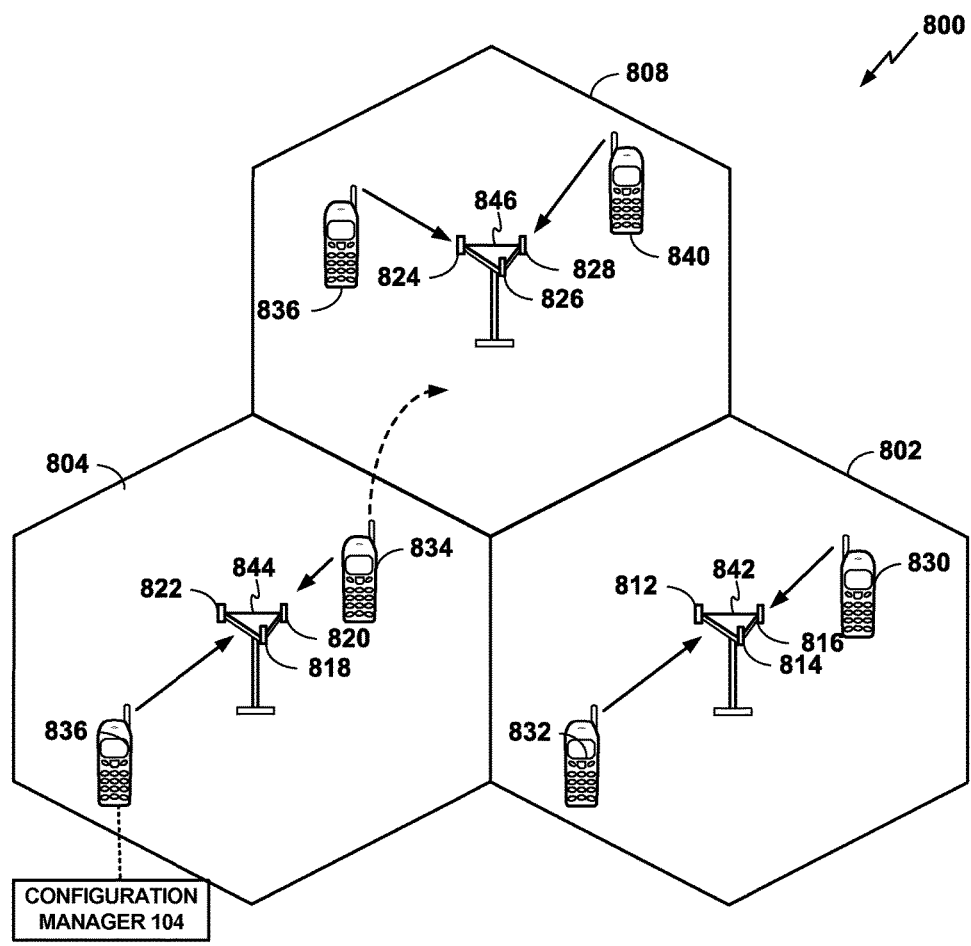
FIG. 8 is a conceptual diagram illustrating an example of an access network including a user equipment with a configuration manager according to the present disclosure.

Referring to FIG. 8, an access network 800 in a UTRAN architecture is illustrated, and may include one or more UEs 830, 832, 834, 836, 838, and 840, which may be the same as or similar to UE 102 (FIG. 1) in that they are configured to include configuration manager 104 (FIG. 1; for example, illustrated here as being associated with UE 836) for performing discontinuous transmission (DTX) when continuous packet connectivity (CPC) and dedicated channel (DCH) enhancements are configured at a user equipment (UE). The multiple access wireless communication system includes multiple cellular regions (cells), including cells 802, 804, and 806, each of which may include one or more sectors. The multiple sectors can be formed by groups of antennas with each antenna responsible for communication with UEs in a portion of the cell. For example, in cell 802, antenna groups 812, 814, and 816 may each correspond to a different sector. In cell 804, antenna groups 818, 820, and 822 each correspond to a different sector. In cell 806, antenna groups 824, 826, and 828 each correspond to a different sector. UEs, for example, 830, 832, etc. may include several wireless communication devices, e.g., User Equipment or UEs, including configuration manager 104 of FIG. 1, which may be in communication with one or more sectors of each cell 802, 804, or 808. For example, UEs 830 and 832 may be in communication with Node B 842, UEs 834 and 836 may be in communication with Node B 844, and UEs 838 and 840 can be in communication with Node B 846. Here, each Node B 842, 844, 846 is configured to provide an access point to a CN 704 (FIG. 7) for all the UEs 830, 832, 834, 836, 838, 840 in the respective cells 802, 804, and 806. Additionally, each Node B 842, 844, 846 may be base station 112 and/or UEs 830, 832, 834, 836, 838, 840 may be UE 102 of FIG. 1 and may perform the methods outlined herein.

As the UE 834 moves from the illustrated location in cell 804 into cell 806, a serving cell change (SCC) or handover may occur in which communication with the UE 834 transitions from the cell 804, which may be referred to as the source cell, to cell 806, which may be referred to as the target cell. Management of the handover procedure may take place at the UE 834, at the Node Bs corresponding to the respective cells, at a radio network controller 706 (FIG. 7), or at another suitable node in the wireless network. For example, during a call with the source cell 804, or at any other time, the UE 834 may monitor various parameters of the source cell 804 as well as various parameters of neighboring cells such as cells 806 and 802. Further, depending on the quality of these parameters, the UE 834 may maintain communication with one or more of the neighboring cells. During this time, the UE 834 may maintain an Active Set, that is, a list of cells that the UE 834 is simultaneously connected to (i.e., the UTRA cells that are currently assigning a downlink dedicated physical channel DPCH or fractional downlink dedicated physical channel F-DPCH to the UE 834 may constitute the Active Set).

Further, the modulation and multiple access scheme employed by the access network 800 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 1002.11 (Wi-Fi), IEEE 1002.16 (WiMAX), IEEE 1002.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 9:
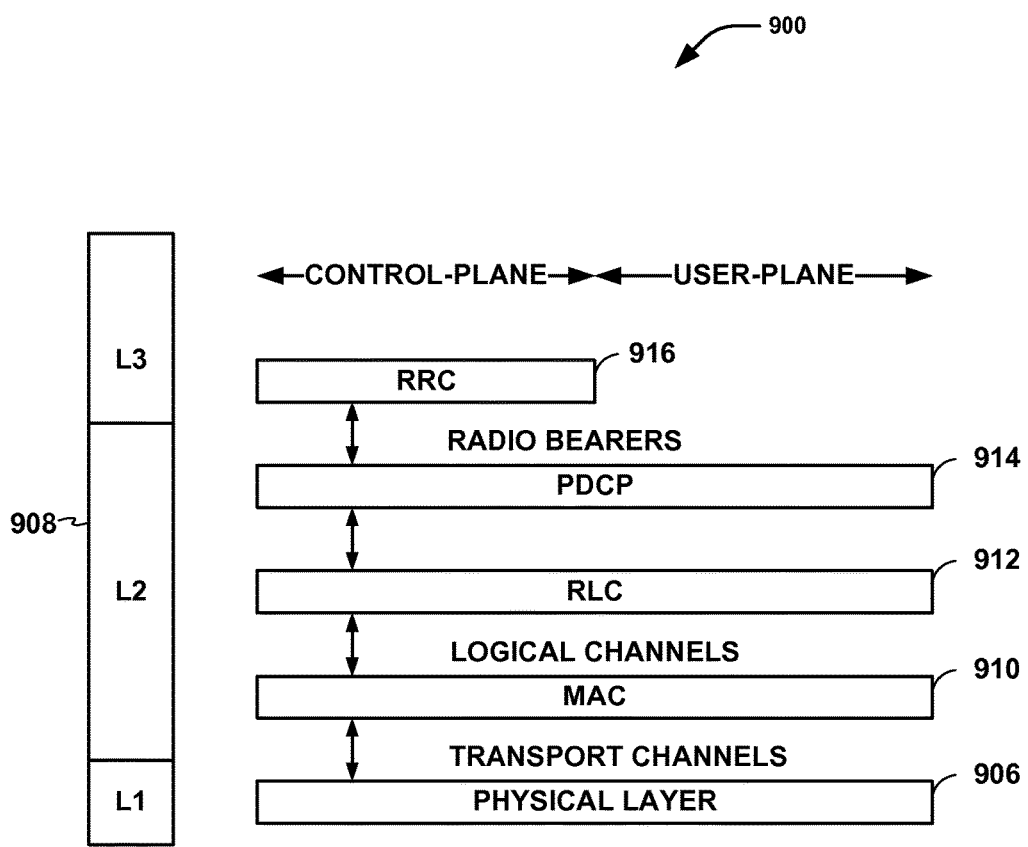
FIG. 9 is a conceptual diagram illustrating an example of a radio protocol architecture for the user and control plane that may be used by the user equipment of the present disclosure.

The radio protocol architecture may take on various forms depending on the particular application. An example for an HSPA system will now be presented with reference to FIG. 9. FIG. 9 is a conceptual diagram illustrating an example of the radio protocol architecture for the user and control planes.

Turning to FIG. 9, the radio protocol architecture for the UE, for example, UE 102 of FIG. 1 configured to include configuration manager 104 (FIGS. 1 and 9) for performing discontinuous transmission (DTX) when continuous packet connectivity (CPC) and dedicated channel (DCH) enhancements are configured at a user equipment (UE) is shown with three layers: Layer 1 (L1), Layer 2 (L2), and Layer 3 (L3). Layer 1 is the lowest lower and implements various physical layer signal processing functions. Layer 1 (L1 layer) is referred to herein as the physical layer 906. Layer 2 (L2 layer) 908 is above the physical layer 906 and is responsible for the link between the UE and Node B over the physical layer 906.

In the user plane, L2 layer 908 includes a media access control (MAC) sublayer 910, a radio link control (RLC) sublayer 912, and a packet data convergence protocol (PDCP) 914 sublayer, which are terminated at the Node B on the network side. Although not shown, the UE may have several upper layers above L2 layer 908 including a network layer (e.g., IP layer) that is terminated at a PDN gateway on the network side, and an application layer that is terminated at the other end of the connection (e.g., far end UE, server, etc.).

The PDCP sublayer 914 provides multiplexing between different radio bearers and logical channels. The PDCP sublayer 914 also provides header compression for upper layer data packets to reduce radio transmission overhead, security by ciphering the data packets, and handover support for UEs between Node Bs. The RLC sublayer 912 provides segmentation and reassembly of upper layer data packets, retransmission of lost data packets, and reordering of data packets to compensate for out-of-order reception due to hybrid automatic repeat request (HARQ). The MAC sublayer 910 provides multiplexing between logical and transport channels. The MAC sublayer 910 is also responsible for allocating the various radio resources (e.g., resource blocks) in one cell among the UEs. The MAC sublayer 910 is also responsible for HARQ operations.

Figure 10:
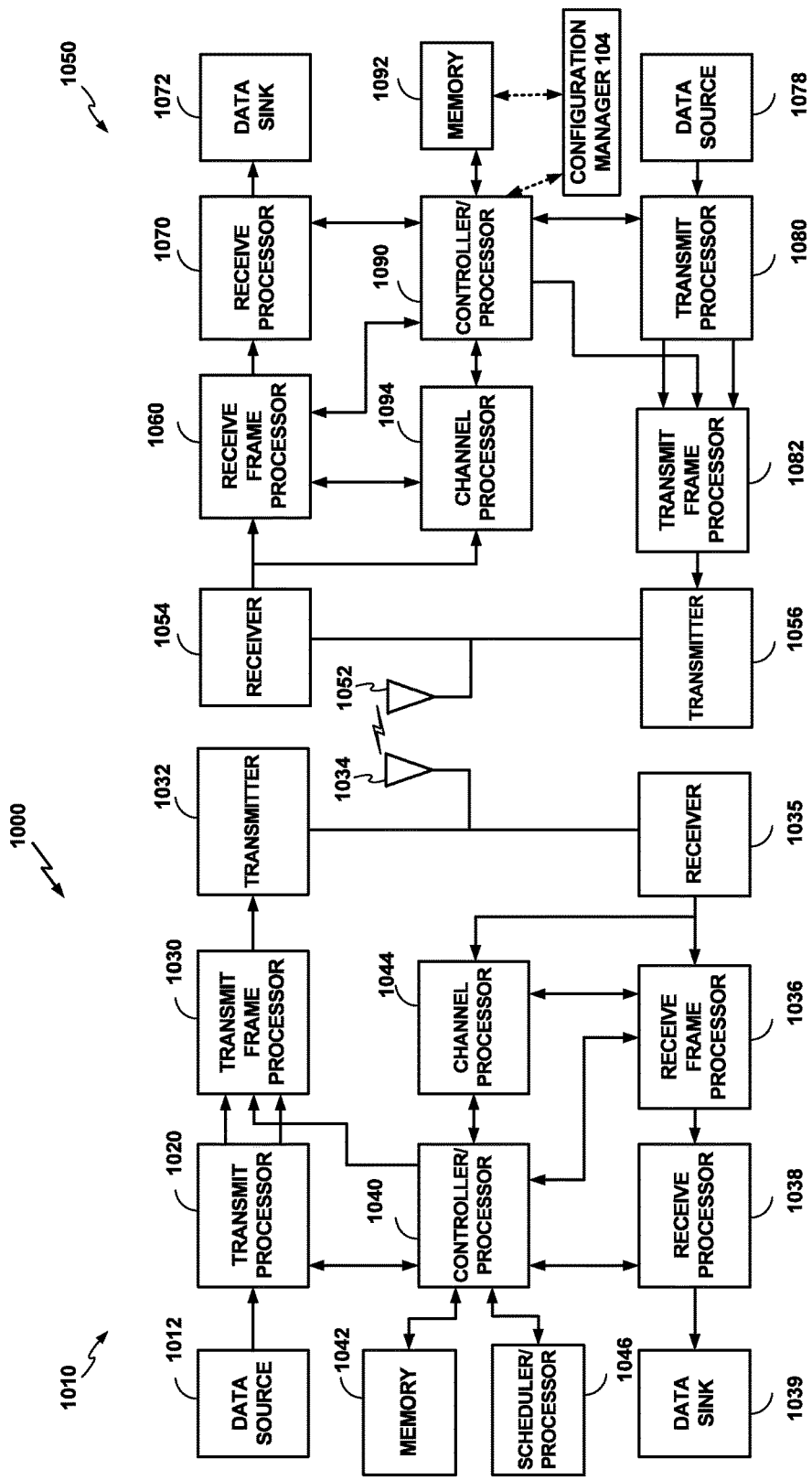
FIG. 10 is a block diagram conceptually illustrating an example of a Node B in communication with a UE, which includes a configuration manager according to the present disclosure, in a telecommunications system.

FIG. 10 is a block diagram of a Node B 1010 in communication with a UE 1050, where the Node B 1010 may be base station 112 of network entity 110 and/or the UE 1050 may be the same as or similar to UE 102 of FIG. 1 in that it is configured to include configuration manager 104 (FIG. 1) for performing discontinuous transmission (DTX) when continuous packet connectivity (CPC) and dedicated channel (DCH) enhancements are configured at a user equipment (UE), in controller/processor 1090 and/or memory 1092. In the downlink communication, a transmit processor 1020 may receive data from a data source 1012 and control signals from a controller/processor 1040. The transmit processor 1020 provides various signal processing functions for the data and control signals, as well as reference signals (e.g., pilot signals). For example, the transmit processor 1020 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1044 may be used by a controller/processor 1040 to determine the coding, modulation, spreading, and/or scrambling schemes for the transmit processor 1020. These channel estimates may be derived from a reference signal transmitted by the UE 1050 or from feedback from the UE 1050. The symbols generated by the transmit processor 1020 are provided to a transmit frame processor 1030 to create a frame structure. The transmit frame processor 1030 creates this frame structure by multiplexing the symbols with information from the controller/processor 1040, resulting in a series of frames. The frames are then provided to a transmitter 1032, which provides various signal conditioning functions including amplifying, filtering, and modulating the frames onto a carrier for downlink transmission over the wireless medium through antenna 1034. The antenna 1034 may include one or more antennas, for example, including beam steering bidirectional adaptive antenna arrays or other similar beam technologies.

At UE 1050, a receiver 1054 receives the downlink transmission through an antenna 1052 and processes the transmission to recover the information modulated onto the carrier. The information recovered by the receiver 1054 is provided to a receive frame processor 1060, which parses each frame, and provides information from the frames to a channel processor 1094 and the data, control, and reference signals to a receive processor 1070. The receive processor 1070 then performs the inverse of the processing performed by the transmit processor 1020 in the Node B 1010. More specifically, the receive processor 1070 descrambles and de-spreads the symbols, and then determines the most likely signal constellation points transmitted by the Node B 1010 based on the modulation scheme. These soft decisions may be based on channel estimates computed by the channel processor 1094. The soft decisions are then decoded and de-interleaved to recover the data, control, and reference signals. The CRC codes are then checked to determine whether the frames were successfully decoded. The data carried by the successfully decoded frames will then be provided to a data sink 1072, which represents applications running in the UE 1050 and/or various user interfaces (e.g., display). Control signals carried by successfully decoded frames will be provided to a controller/processor 1090. When frames are unsuccessfully decoded by the receive processor 1070, the controller/processor 1090 may also use an acknowledgement (ACK) and/or negative acknowledgement (NACK) protocol to support retransmission requests for those frames.

In the uplink, data from a data source 1078 and control signals from the controller/processor 1090 are provided to a transmit processor 1080. The data source 1078 may represent applications running in the UE 1050 and various user interfaces (e.g., keyboard). Similar to the functionality described in connection with the downlink transmission by the Node B 1010, the transmit processor 1080 provides various signal processing functions including CRC codes, coding and interleaving to facilitate FEC, mapping to signal constellations, spreading with OVSFs, and scrambling to produce a series of symbols. Channel estimates, derived by the channel processor 1094 from a reference signal transmitted by the Node B 1010 or from feedback contained in the midamble transmitted by the Node B 1010, may be used to select the appropriate coding, modulation, spreading, and/or scrambling schemes. The symbols produced by the transmit processor 1080 will be provided to a transmit frame processor 1082 to create a frame structure. The transmit frame processor 1082 creates this frame structure by multiplexing the symbols with information from the controller/processor 1090, resulting in a series of frames. The frames are then provided to a transmitter 1056, which provides various signal conditioning functions including amplification, filtering, and modulating the frames onto a carrier for uplink transmission over the wireless medium through the antenna 1052.

The uplink transmission is processed at the Node B 1010 in a manner similar to that described in connection with the receiver function at the UE 1050. A receiver 1035 receives the uplink transmission through the antenna 1034 and processes the transmission to recover the information modulated onto the carrier. The information recovered by the receiver 1035 is provided to a receive frame processor 1036, which parses each frame, and provides information from the frames to the channel processor 1044 and the data, control, and reference signals to a receive processor 1038. The receive processor 1038 performs the inverse of the processing performed by the transmit processor 1080 in the UE 1050. The data and control signals carried by the successfully decoded frames may then be provided to a data sink 1039 and the controller/processor, respectively. If some of the frames were unsuccessfully decoded by the receive processor, the controller/processor 1040 may also use an acknowledgement (ACK) and/or negative acknowledgement (NACK) protocol to support retransmission requests for those frames.

The controller/processors 1040 and 1090 may be used to direct the operation at the Node B 1010 and the UE 1050, respectively. For example, the controller/processors 1040 and 1090 may provide various functions including timing, peripheral interfaces, voltage regulation, power management, and other control functions. The computer readable media of memories 1042 and 1092 may store data and software for the Node B 1010 and the UE 1050, respectively. A scheduler/processor 1046 at the Node B 1010 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for performing a discontinuous transmission (DTX) when continuous packet connectivity (CPC) and dedicated channel (DCH) enhancements are configured at a user equipment (UE), comprising:
   identifying whether the DTX is allowed in association with the CPC at the UE during a first time period;
   determining whether the DTX is allowed in association with the DCH enhancements at the UE during a second time period;
   performing the DTX at the UE during a third time period when the first time period and the second time period allow for the DTX, at least partially, and wherein the third time period is a duration during which there is overlap between both the DTX of the CPC and the DTX of the DCH enhancements; and
   allowing transmission during time periods when there is no overlap between both the DTX of the CPC and the DTX of the DCH enhancements.

2. The method of claim 1, further comprising:
   receiving a transmit power control (TPC) bit on a downlink dedicated physical control channel (DL DPCCH) during the third time period, and wherein the third time period is a same time period for receiving a fractional-dedicated physical channel (F-DPCH).

3. The method of claim 1, wherein the CPC is configured with a 2 ms transmission time interval (TTI) and the DCH enhancements is configured with a 10 ms TTI.

4. The method of claim 1, wherein the identifying is based on whether the UE is performing the DTX of an uplink dedicated physical control channel (UL DPCCH).

5. The method of claim 1, wherein the identifying and the determining are based on a release number or radio access capabilities of the UE.

6. The method of claim 1, wherein the performing includes performing the DTX of all uplink channels at the UE during the third time period.

7. The method of claim 1, further comprising:
   identifying whether discontinuous reception (DRX) is allowed in association with the CPC at the UE during the third time period;
   determining whether the DRX is allowed in association with the DCH enhancements at the UE during the third time period; and
   performing the DRX at the UE during the third time period when both the CPC and the DCH enhancements allow for the DRX.

8. An apparatus for performing a discontinuous transmission (DTX) when continuous packet connectivity (CPC) and dedicated channel (DCH) enhancements are configured at a user equipment (UE), comprising:
   means for identifying whether the DTX is allowed in association with the CPC at the UE during a first time period;
   means for determining whether the DTX is allowed in association with the DCH enhancements at the UE during a second time period;
   means for performing the DTX at the UE during a third time period when the first time period and the second time period allow for the DTX, at least partially, and wherein the third time period is a duration during which there is overlap between both the DTX of the CPC and the DTX of the DCH enhancements; and
   means for allowing transmission during time periods when there is no overlap between both the DTX of the CPC and the DTX of the DCH enhancements.

9. The apparatus of claim 8, further comprising:
   means for receiving a transmit power control (TPC) bit on a downlink dedicated physical control channel (DL DPCCH) during the third time period, and wherein the third time period is a same time period for receiving a fractional-dedicated physical channel (F-DPCH).

10. The apparatus of claim 8, wherein the identifying is based on whether the UE is performing the DTX of an uplink dedicated physical control channel (UL DPCCH).

11. The apparatus of claim 8, wherein the identifying and the determining are based on a release number or radio access capabilities of the UE.

12. The apparatus of claim 8, wherein the means for performing includes means for performing the DTX of all uplink channels at the UE during the third time period.

13. The apparatus of claim 8, further comprising:
   means for identifying whether a discontinuous reception (DRX) is allowed in association with the CPC at the UE during the third time period;
   means for determining whether the DRX is allowed in association with the DCH enhancements at the UE during the third time period; and
   means for performing the DRX at the UE during the third time period when both the CPC and the DCH enhancements allow for the DRX.

14. A non-transitory computer readable medium and a processor to execute stored computer executable code for performing a discontinuous transmission (DTX) when continuous packet connectivity (CPC) and dedicated channel (DCH) enhancements are configured at a user equipment (UE), comprising:
  code for identifying whether the DTX is allowed in association with the CPC at the UE during a first time period;
  code for determining whether the DTX is allowed in association with the DCH enhancements at the UE during a second time period;
  code for performing the DTX at the UE during a third time period when the first time period and the second time period allow for the DTX, at least partially, and wherein the third time period is a duration during which there is overlap between both the DTX of the CPC and the DTX of the DCH enhancements; and
  code allowing transmission during time periods when there is no overlap between both the DTX of the CPC and the DTX of the DCH enhancements.

15. The computer readable medium of claim 14, further comprising:
  code for receiving a transmit power control (TPC) bit on a downlink dedicated physical control channel (DL DPCCH) during the third time period, and wherein the third time period is a same time period for receiving a fractional-dedicated physical channel (F-DPCH).

16. The computer readable medium of claim 14, wherein the identifying is based on whether the UE is performing the DTX of an uplink dedicated physical control channel (UL DPCCH).

17. The computer readable medium of claim 14, wherein the identifying and the determining are based on a release number or radio access capabilities of the UE.

18. The computer readable medium of claim 14, wherein the code for performing includes code for performing the DTX of all uplink channels at the UE during the third time period.

19. The computer readable medium of claim 14, further comprising:
  code for identifying whether a discontinuous reception (DRX) is allowed in association with the CPC at the UE during the third time period;
  code for determining whether the DRX is allowed in association with the DCH enhancements at the UE during the third time period; and
  code for performing the DRX at the UE during the third time period when both the CPC and the DCH enhancements allow for the DRX.

20. An apparatus for performing a discontinuous transmission (DTX) when continuous packet connectivity (CPC) and dedicated channel (DCH) enhancements are configured at a user equipment (UE), comprising:
  a memory; and
  at least one processor coupled to the memory and configured to:
  identify whether the DTX is allowed in association with the CPC at the UE during a first time period;
    determine whether the DTX is allowed in association with the DCH enhancements at the UE during a second time period;
    perform the DTX at the UE during a third time period when the first time period and the second time period allow for the DTX, at least partially, and wherein the third time period is a duration during which there is overlap between both the DTX of the CPC and the DTX of the DCH enhancements; and
  allow transmission during time periods when there is no overlap between both the DTX of the CPC and the DTX of the DCH enhancements.

21. The apparatus of claim 20, wherein the at least one processor is further configured to
  receive a transmit power control (TPC) bit on a downlink dedicated physical control channel (DL DPCCH) during the third time period, and wherein the third time period is a same time period for receiving a fractional dedicated physical channel (F-DPCH).

22. The apparatus of claim 20, wherein the CPC is configured with a 2 ms transmission time interval (TTI) and the DCH enhancements is configured with a 10 ms TTI.

23. The apparatus of claim 20, wherein the at least one processor is further configured to identify based on whether the UE is configured to perform the DTX of an uplink dedicated physical control channel (UL DPCCH).

24. The apparatus of claim 20, wherein the at least one processor is further configured to identify and determine based on a release number or radio access capabilities of the UE.

25. The apparatus of claim 20, wherein the at least one processor is further configured to perform the DTX of all uplink channels at the UE during the third time period.

26. The apparatus of claim 20, wherein the at least one processor is further configured to:
  identify whether a discontinuous reception (DRX) is allowed in association with the CPC at the UE during the third time period;
  determine whether the DRX is allowed in association with the DCH enhancements at the UE during the third time period; and
  perform the DRX at the UE during the third time period when both the CPC and the DCH enhancements allow for the DRX.

* * * * *